United States Patent [19]

Pepper

[11] Patent Number: 5,042,922

[45] Date of Patent: Aug. 27, 1991

[54] METHOD FOR IMPROVIDNG THE SPATIAL RESOLUTION IN AN INTEGRATED ADAPTIVE OPTICS APPARATUS

[75] Inventor: David M. Pepper, Malibu, Calif.

[73] Assignee: Hughes Aircraft Company, Los Angeles, Calif.

[21] Appl. No.: 865,224

[22] Filed: May 20, 1986

[51] Int. Cl.⁵ .................................................. G02F 1/13
[52] U.S. Cl. ...................................... 359/72; 359/94; 359/95
[58] Field of Search ............... 350/348, 342, 572, 573, 350/169, 172, 286, 162, 163, 164, 401, 356, 349, 345, 362

[56] References Cited

U.S. PATENT DOCUMENTS

| 4,013,345 | 3/1977 | Roach | 350/161 |
| 4,441,791 | 4/1984 | Hornbeck | 350/360 |
| 4,481,531 | 11/1984 | Warde et al. | 358/60 |

OTHER PUBLICATIONS

F. A. Jenkins & H. E. White "Fundamentals of Optics", Third Edition McGraw-Hill Book Company, New York, 1957, pp. 243-244.

Smith et al., "Real-Time Optical Processing Using the Liguid Crystal Light Valve", *J. of Appl. Photographic Engineering*, vol. 5, No. 4, Fall 1979.

C. Warde et al., "High Resolution Adaptive Phase Compensation for Low-Visibility Optical Communication", *IEEE Journal 1980*, pp. 539-545, Eascon Conference Proceedings.

A. D. Fisher et al., "Technique for Real-Time High-Resolution Adaptive Phase Compensation", *Optics Letters*, Jul. 1983, vol. 8, No. 7, pp. 353-355.

J. H. Shapiro et al., "Optical Communication through Low Visibility Weather", *Optical Engineering*, Jan/Feb. 1981, vol. 20, No. 1, pp. 76-83.

T. R. O'Meara et al., "Applications of Nonlinear Phase Conjugation in Compensated Active Imaging", *Optical Engineering*, Mar./Apr. 1982, vol. 21, No. 2, pp. 231-235.

H. J. Deuling, "Deformation of Nematic Liquid Crystals in an Electric Field", *Molecular Crystals and Liquid Crystals*, 1972, vol. 19, pp. 123-131.

O. V. Garibyan, "Optical Phase Conjugation by Microwatt Power of Reference Waves Via Liquid Crystal Light Valve", *Optics Communications*, vol. 38, No. 1, Jul. 1, 1981, pp. 67-70.

*Primary Examiner*—Nelson Moskowitz
*Attorney, Agent, or Firm*—V. D. Duraiswamy; W. K. Denson-Low

[57] ABSTRACT

Apparatus is disclosed for correcting wavefront errors in adaptive optics systems. A modified liquid crystal light valve is used as an integrated wavefront sensing and wavefront control system. A remote reference aberrated wavefront 10 first reflects off the liquid crystal substrate 20 and is then transferred by beam-splitters 14 and 15a, b and reflector 19 to the rear surface of the liquid crystal light valve 12. A one-to-one imaging system composed of lenses 70a, b and spatial filter 72 provide a new diffraction-limited optical transfer system which allows full use of the extremely high resolution capabilities of the liquid crystal light valve 12. The wavefront 10, after being imaged by the optical transfer system, is combined with a local reference plane 16, the interference pattern from which strikes the rear surface photoconductor 26. The photoconductor electrons liberated serve to alter the voltage across the liquid crystal at those points where the interference pattern has right maxima. Using a tunable birefringent liquid crystal layer 20, a voltage change causes a commensurate refractive index change in the liquid crystal substrate. These refractive index changes alter the optical path length of particular portions of the aberrated wavefront and the device's inherent negative feedback drives these phase errors to zero, at which point the wavefront 18 is completely corrected. A second laser beam 11 may be sent out of the device, reflecting off the corrective liquid crystal layer and predistorting it in order to correct for atmospheric path disturbances. The present invention provides an adaptive optics correction system possessing extraordinarily high spatial resolution.

14 Claims, 7 Drawing Sheets

METHOD FOR IMPROVING THE SPATIAL RESOLUTION IN AN INTEGRATED ADAPTIVE OPTICS APPARATUS

The Government of the United States of America has rights in this invention pursuant to a government contract.

BACKGROUND OF THE INVENTION

1. Cross Reference to Related Commonly Owned Patent Applications and Rights

The present patent application is related to a patent application Ser. No. 865,231 entitled "Integrated Adaptive Optics Apparatus," by Thomas R. O'Meara and George C. Valley, filed on May 20, 1986, and to U.S. Pat. No. 4,019,807—Boswell et al., entitled "Reflective Liquid Crystal Light Valve with Hybrid Field Effect Mode", both assigned to Hughes Aircraft Company. The specifications of the related commonly owned patent application and patent are hereby incorporated by reference into the present application.

2. Field of the Invention

The present invention pertains to adaptive optics systems used in the correction and preconditioning of high energy laser beams. The specific focus of the preferred embodiment is the improvement in performance and spatial resolution of an adaptive optics correction system which utilizes a liquid crystal light valve.

3. Background Information

Since the invention of the laser in the 1950s, the optics industry has succeeded at vastly improving the power and utility of coherent light sources. The amount of radiant energy which can be transmitted over great distances with a minimum of scattering and diffraction losses has increased dramatically. In addition, a great number of applications have been developed for exploiting the spectral purity and spatial coherence of the laser beam. Communications, data transfer, and the projection and processing of images have come to depend upon the unique properties of the coherent laser wavefront. These properties must be preserved if the powerful and beneficial qualities of laser radiation are to be fully utilized. Except in free space, a laser beam travels through a material medium. When a laser beam propagates through glass, salt, or quartz lens arrangements; optical fibers; or the atmosphere, the wavefront quality of the laser beam is reduced. High spatial quality waves, upon traversing such optical systems, become aberrated; a plane wave emerges with a randomly perturbed wavefront. The diffraction associated with such aberrated waves significantly reduces the ability to focus the beam to a high-quality beamspot or to efficiently transmit a communications signal to a remote receiver.

Another problem occurs when such laser wavefronts are transmitting large amounts of energy. Some portion of that energy is absorbed when it passes through a given optics system of lenses, mirrors, and other optical devices, or travels through the atmosphere. Typically, when materials absorb energy and heat up, their index of refraction changes. This change in index varies across a given beam profile. The intensity of the beam and the amount of heat absorbed vary as a function of location within the beam. Differences in index cause refraction of a laser beam, just as the heated air above the desert bends the image of the sky into a mirage. The consequent spreading of the high-energy laser beam due to a laser-induced index differential is termed "thermal blooming". For a laser system intended to deliver an appreciable amount of energy over a long distance, such an effect is disastrous. The beam which arrives at its target has spread too far, and even if it were to be focused, the phase of the beam across its wavefront is so randomized that on the whole it destructively interferes and cancels itself out. The laser beam delivers only a small fraction of the excited laser medium.

In order to counteract these deleterious effects of atmospheric turbulence, thermal blooming, and irregularities within the optical train, adaptive optical systems have been explored and developed. These systems combine wavefront sensing and wavefront correction within a closed feedback loop in order to correct a particular laser beam's wavefront errors. A typical laser beam direction system might work as follows. A laser beam is directed via an atmospheric path to a target or receiving site. Because of turbulence and thermal blooming, only a portion of the radiation reaches the target. With cooperative systems, a laser reference is transmitted back through the atmosphere in order to be used as a probe wave which samples the atmospheric aberrations the light has encountered. Corner reflectors or target glints in uncooperative systems can reflect impinging laser radiation to achieve the same result. In essence, the return signal contains in its wavefront phase all the aberrations of the beam path. If the phase aberrations are then sensed and the laser beam is pre-aberrated to correspond to this phase pattern, during its propagation through the atmosphere the laser will retrace the path of the target radiation and arrive at the target unaberrated: the full amount of beam energy will then been transferred.

A variety of apparatus and methods have been advanced for this type of beam correction. The deformable mirror is perhaps the most popular and most easily understood. The deformable mirror is composed of a thin flexible glass, metallic sheet, or metallized membrane behind which is an array of piezoelectric or solenoid actuators. These actuators are push-pull devices which deform the mirror surface from its normal planar state. The reference radiation returning to the laser aiming system strikes this deformable mirror, passes through the adaptive optics system, and the wavefront's phase aberrations are measured by any one of a number of standard techniques which are well known to those persons skilled in the art. This phase information, transformed to electronic signals by a wavefront error sensor and operated upon by electronic signal processors and computer algorithms, governs the voltages to be applied to each actuator. The system continuously adjusts the mirror's front contour until the return target radiation is restored to a perfect wavefront. Then, the laser radiation reflected by this deformed mirror is the time-reversed phase conjugate of the return target radiation and arrives at the target almost completely unaberrated, despite thousands of kilometers of atmospheric turbulence and thermal effects.

The deformable mirror possesses a great number of inherent problems. The use of discrete, bulky electrical actuators limits the spatial frequency response for the mirror; a deformable mirror simply can not correct errors finer than the spacing of the push-pull actuator elements. In addition, such actuators typically require several thousand volts for operation and are subject to arcovers and permanent breakdowns. Their impedance combined with the mass of the mirror surface limits the temporal frequency response of the adaptive system. Each detector actuator feedback loop requires discrete electronic processing systems and considerable amplification to function. Since the thin front surface of the mirror continuously experiences flexures, it suffers from eventual drift and creep problems with consequent loss in performance.

In an attempt to improve upon the deformable mirror's performance, other phase-conjugation approaches have been attempted. Nonlinear optical media, using stimulated Brillouin or Raman scattering, can provide a time-reversed wave as an output in some applications. In these methods, the medium is pumped by one or more local reference lasers and the electric field of the return distorted target radiation, upon entering the phase-conjugation cell, causes index variations within the nonlinear medium in exact correspondence to the interference pattern between the remote reference beam and the local pump beams. A high-energy laser reflecting off this index grating has its phase altered exactly as a phase-conjugate of the target beam. Again the laser propagates through the atmosphere with aberrations already corrected.

While this phase-conjugation method greatly improves the spatial resolution of the system (the "actuator spacing" is now molecular) it also possesses serious problems. The input sensitivity is very low, so that a fairly large return signal is necessary in order to set up the proper index grating structure within the phase-conjugation cell. Such power requirements rule out this method for lower-power optical communication and data transfer systems. In addition, the pump beams require an enormous amount of energy and must be precisely aligned for the device to function. The wasted costs of duplicate high-energy lasers for pumping the medium and the resulting low efficiency conversion and transmission of the energy to the target make phase conjugation an interesting but often impracticable means for adaptive optics applications.

None of the methods or devices described above provides an efficient and comprehensive solution to the problem of correcting the phase of an aberrated light wave. None of these methods provides a versatile, highly sensitive, compact, and simple apparatus for adaptively correcting coherent light wavefronts. An effective solution to this problem would satisfy a long felt need experienced by the optical community for over two decades. A truly practical and reliable means for precisely correcting the phase of a given light wave would represent a major advancement in the field of adaptive optics. Utilization of such a device within laser beam direction systems would enable extraordinarily complete wavefront improvement of system and atmospheric distortions. Such an invention would ideally be suited to operate in cooperation with a wide variety of adaptive optics systems and enhance any optical apparatus requiring high-resolution wavefront correction.

SUMMARY OF THE INVENTION

The present invention, by improving the resolving capability of a liquid crystal liquid valve adaptive optics system, accomplishes a major technological advancement by introducing an effective, compact, simple device which enables the active correction of aberrated wavefronts to a precision heretofore unattainable. This invention utilizes a one-to-one imaging system in conjunction with a particular version of the liquid crystal light valve. The resulting adaptive optics system performs with near-diffraction-limited resolution for wavefront sensing and correction.

If the usual liquid crystal element in a standard liquid crystal light valve (U.S. Pat. No. 4,019,807, Hughes Model H-4060 with either a CdS or Si photoconductor) is replaced with a parallel-aligned tunable birefringent liquid crystal substrate, the device can be used as a deformable mirror. The liquid crystal light valve device, however, requires no signal processing, no electrical amplifications, and no high-voltage sources. It possesses a spatial resolution of approximately thirty microns per pixel. In contrast, a typical deformable mirror might have 16 to 60 pixels spread over an area of 100 square centimeters.

Aberrated light from the target, degraded by all the distortions of its travel path, passes through the new liquid crystal element, reflects off a dielectric mirror, passes through the liquid crystal element once more, and is transferred by various optical means to the back side of the liquid crystal light valve where it combines with a locally generated unaberrated wavefront. The two combined wavefronts create an interference pattern which through careful alignment is in exact registration with the incident target wavefront hitting the front side of the liquid crystal device. A photoconductive layer lies sandwiched behind the liquid crystal element, both substrates being pressed between two clear conductive layers. Once a voltage is placed across these conductors, any change in resistance in the photoconductor due to absorbed radiant energy engenders a commensurate change in voltage across the liquid crystal element at that point. The interference pattern impinging on the photoconductive layer provides such a source of radiant energy and the pattern represents an exact spatial mapping of the wavefront errors of the incoming target radiation. Hence, voltages across the liquid crystal element will change at precisely those points where the phasefront of the target radiation is aberrated. The refractive index and hence optical path length of the liquid crystals will change at those points due to the applied field. Hence, these microscopic phase-shifting elements will push or pull the incoming wavefront until a uniform interference pattern is obtained upon the photoconductive side of the liquid crystal light valve device, at which point the servo-system is in equilibrium.

When the interference pattern is uniform, the incoming wavefront is completely corrected and the liquid crystal "mirror" can be used to send a preaberrated high energy laser beam which will arrive at a given target point completely unaberrated. Because liquid crystal devices are known to withstand hundreds of thousands of watts of radiant energy per square centimeter, the present invention is ideally suited for such high energy laser applications. But since it requires very little power to produce the desired phase modulation effects, the element can also be used to great advantage in very precise image, and data processing systems. Moreover, the rather uniform wavelength dependence of the phase shifts created in the liquid crystal mirror allow multiple wavelength use of the device, just as in conventional deformable mirror technology.

The one-to-one imaging system inserted within the optical train between the front of the liquid crystal reflector and the rear-side photoconductive layer provides a near-diffraction-limited optical transfer means, completely compatible with the pixel resolution of the liquid crystal light valve itself.

It is, therefore, an object of the present invention to provide apparatus which combines capabilities for wavefront sensing, signal processing, and wavefront correction within one solid-state device for adaptive optics purposes.

It is also an object of the present invention to provide optical transfer means for a high-spatial-bandwidth wavefront correction system allowing near-diffraction-limited performance.

Another object of the invention is to provide an adaptive optics wavefront correction system possessing the ability to compensate with extraordinarily high spatial resolution.

Still another object of the invention is to provide an adaptive optics system capable of operating with low incident light intensity, making possible straight-forward wavefront correction systems for data and image transferral systems.

It is also an object of the invention to provide a high-gain coherent wavefront replicator with near-quantum-limited noise performance.

Yet another object of the invention is to provide a wavefront correction system capable of correcting and reflecting the radiation of a high-energy laser.

It is also an object of the invention to provide an adaptive optics system capable of sensing and correcting an incident wavefront's phase errors with very fast response.

Still another object of the invention is to provide a wavefront sensing and correction system requiring only minimal operating power.

It is a further object of the invention to provide an adaptive optics system capable of sensing and correcting atmospheric and optical system aberrations at one wavelength of light while also reflecting light from another source at a different wavelength.

It is a further object of the invention to provide a wavefront correction system capable of combining the outputs of multiple low-power lasers with random phasing into a single higher-power coherent beam.

Yet another object of the invention is to reduce the cost, size, and weight of adaptive optics systems, making possible various space-borne applications which were previously impractical.

Still another object of the invention is to eliminate the need for costly, bulky, and time-consuming data processing and signal amplification in adaptive optics systems.

An appreciation of other aims and objects of the present invention and a more complete and comprehensive understanding of this invention may be achieved by studying the following description of a preferred embodiment and by referring to the accompanying drawings.

BRIEF DESCRIPTION OF THE DRAWINGS

FIG. 5 shows the operation of the liquid crystal layer of the liquid crystal light valve as it corrects a spatial phase distortion in an incoming remote reference wavefront.

DESCRIPTION OF A PREFERRED EMBODIMENT

Figure 1:
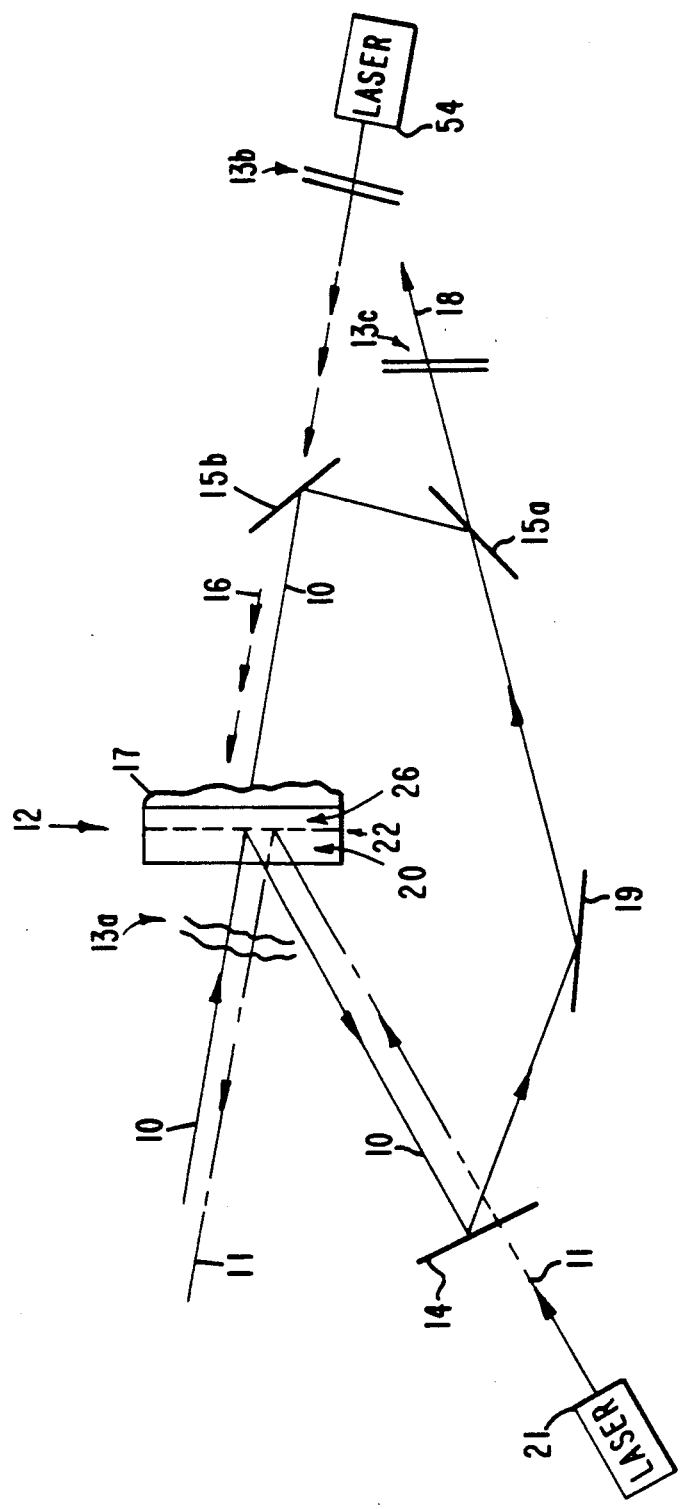
FIG. 1 is a schematic view of the liquid crystal light valve adaptive optics system incorporating a modified liquid crystal light valve. Illustrated are a series of beamsplitters and ray traces of the target return, local reference, and reflected wavefronts.

FIG. 1 is a schematic diagram revealing an adaptive optics system utilizing a liquid crystal light valve 12 to correct phase errors for incoming coherent light wavefronts. A nonaberrated wavefront may be represented by the perfect plane waves depicted in FIG. 2, which are propagating in the x direction. At any point along the x axis, the wavefront 44 has a constant phase in the y direction; i.e., the amplitude of the wave is a constant along the wavefront. An aberrated wave, however, resembles FIG. 3. At any given point in the x direction, the phase of the wavefront 46 varies wildly. The purpose of any adaptive optics system is to bring the aberrated wavefront 46 of FIG. 3 back to an approximate plane wave 44 as in FIG. 2.

For the present invention, a remote reference light beam 10, indicated by wavefronts 13a which represent the aberrated wavefront in need of correction, first strikes the liquid crystal light valve 12. The remote reference wavefront 10, after passing through the depth of the liquid crystal 20, reflects off an internal dielectric mirror 22, and passes through the crystal 20 once again. The remote reference wavefront 10 then reflects off an aperture-sharing component (or beamsplitter) 14, reflective element 19, and beamsplitters 15a,b to be combined with a local reference plane wave 16 at the rear of the liquid crystal light valve 12.

Figure 2:
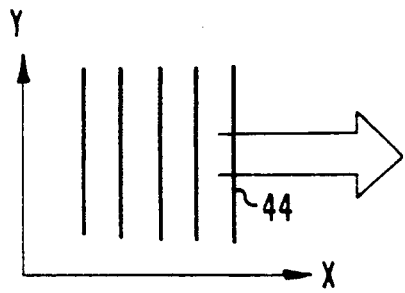
FIG. 2 is a cross-sectional view of a plane wave-front traveling in the x-direction. The local reference and the final corrected wavefront should resemble such plane waves during the operation of the present invention.
Figure 3:
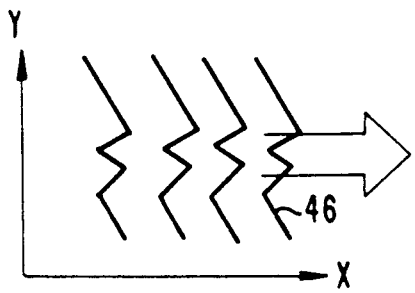
FIG. 3 is a cross-sectional view of an aberrated wave-front where the phase along any given wavefront may vary by several wavelengths or more. The reference wavefront received through atmospheric turbulence, thermal blooming, and optical system distortions would resemble such a front.

The local reference plane wave 16, whose wavefront, indicated by 13b, is analogous to the plane wave patterns in FIG. 2, interferes with the remote reference wavefront 10 creating the characteristic light and dark patterns of interfering light. Local laser oscillator 54 provides the local reference 16 with the same wavelength as the remote reference 10. Where both wavefronts are in phase, i.e., when the remote reference 10 approximates a corrected plane wave, constructive interference, or a bright spot, results. Where the two waves are out of phase, i.e., when the remote reference 10 is aberrated with respect to a perfect plane wave, destructive interference, or a dark region, occurs. The resulting interference pattern 17 of light and dark areas, a "map" of the residual phase error for the reflected remote reference light, illuminates the photoconductive side 26 of the liquid crystal light valve 12. As explained further on, the inherent feedback of the liquid crystal light valve 12 acts to drive this phase error towards zero, at which point the incoming wavefront is well-corrected. This corrected wavefront 18 may exit through beamsplitter 15a and is illustrated by wavefronts 13c.

Figure 4:
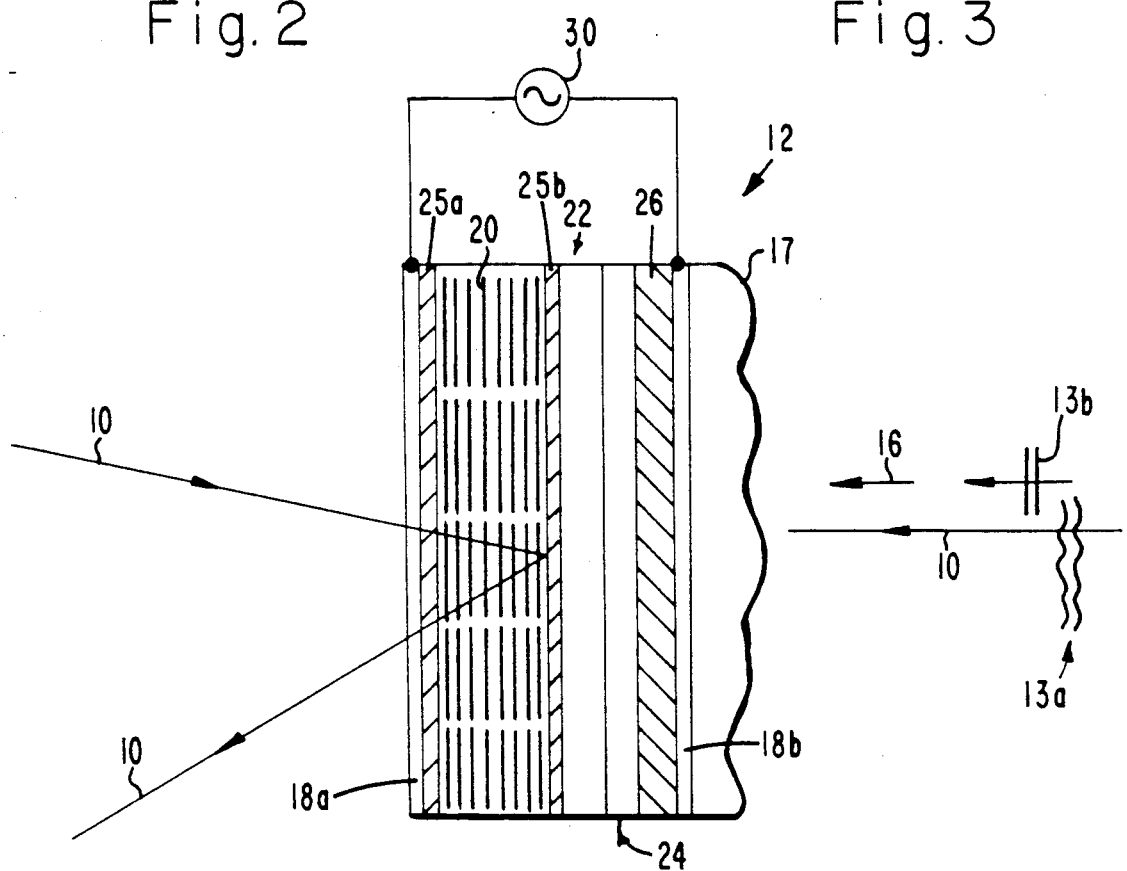
FIG. 4 illustrates the composition of the particular liquid crystal light valve described in the preferred embodiment of the invention.

FIG. 4 illustrates the particular liquid crystal light valve suitable for this adaptive optics application. The liquid crystals themselves must be composed of parallel-aligned birefringent molecules that do not induce any polarizing effects upon the reflected wavefront. (The standard liquid crystal light valve, Hughes Model H-4060, uses nematic liquid crystals which are twisted. Hence, the crystals polarize incident light in various, here undesirable, ways). The new liquid crystals' function depends on their ability to alter their index of refraction with orientation: in other words, it depends upon their electro-optic bire-fringence. Indeed, any substance capable of altering its index with applied voltage without inducing any further polarizing or amplitude modulation effects can be used for the present purpose. With no applied electric field, the liquid crystal alignment layers 25a,b force all the liquid crystal molecules to remain parallel and present a constant index of refraction throughout their depth to any incoming wavefront. If an electric field is applied to a segment of the liquid crystal layer 20, the molecules of that segment rotate and the index of refraction for that segment of the liquid crystal device changes.

Since the remote reference wavefront 10 passes through the front surface transparent electrode 28a, through the liquid crystal 20 and reflects off a dielectric mirror 22, it passes through the same segment of the liquid crystal twice. If the index of refraction for that portion of the liquid crystal device has changed due to an electric field, then the wavefront at that point would see a corresponding change in optical path length, its travel would be retarded or accelerated to some extent and the phase front of the wave at that point would be changed in exactly the way required for correcting wavefront phase errors.

Figure 5A:
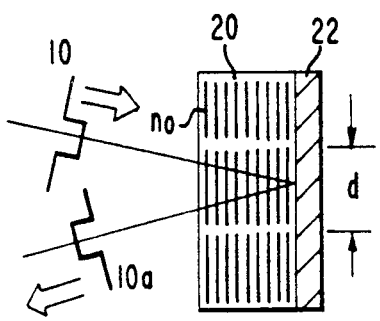
FIG. 5a shows the liquid crystal layer without any change in applied voltage.
Figure 5B:
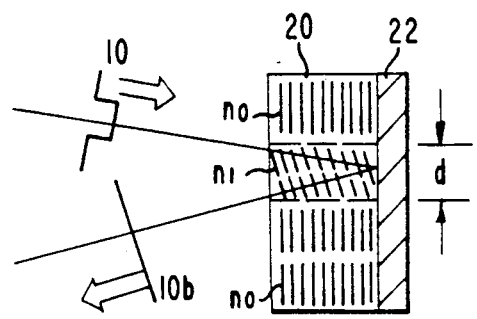
FIG. 5b shows the liquid crystal layer after an applied voltage change and the consequent correction of an incident aberrated wavefront.

FIG. 5 demonstrates how this index alteration corrects wavefront errors. FIG. 5a illustrates a liquid crystal device with a remote reference wavefront 10 passing through the liquid crystal 20, reflecting off the dielectric mirror 22, passing through the liquid crystal once more, and emerging as the output wavefront 10a. The remote reference wavefront 10 has an aberration shown in FIG. 5 as a notch: that portion of the wave is traveling ahead of the wavefront. The liquid crystal has a quiescent, i.e., unrotated, index $n_o$ throughout its breadth and the reflected wavefront 10a exactly matches the input wavefront 10; no wavefront correction has occurred.

When a voltage is applied across the proper portion of the liquid crystal (the mechanism for this voltage application is explained further on) denoted by dimension d, the index of refraction for that portion increases to $n_1$, due to the rotation of the birefringent liquid crystals. The optical path length for that part of the liquid crystal therefore also increases, retarding any wavefront passing through that section. Hence, when the index change is correct, the notch of wavefront 10, after traversing the liquid crystal device, has been pulled back and is now in line with the remainder of the wavefront 10b. At that point, the wavefront is corrected.

The implementation of these unique properties of birefringent liquid crystals for the correction of wavefronts, particularly the proper application of voltages across the breadth of the liquid crystal element, is accomplished by the remaining elements of the liquid crystal light valve 12. After the remote reference wavefront 10 passes through the liquid crystal device 20 and reflects off the dielectric mirror 22, to be combined with the local reference wavefront 16 at the rear of the liquid crystal light valve, the resulting interference pattern 17 transfers through the rear transparent electrode 28b and images onto the photoconductive substrate 26. This imaged pattern must have exact registration with respect to the remote reference wavefront 10 impinging upon the other side of the light valve in order for proper wavefront correction to occur.

A voltage source 30 connected to the two transparent electrodes 28a,b places a potential drop across the combination of liquid crystal 20 and photoconductive substrate 26. This voltage should be 6 Volts for a cadmium sulfide photoconductor and at 10 KHz in frequency. The operation of the photoconductor heterojunction with such an ac voltage supply is taught in other related liquid crystal light valve patents, such as "Reflective liquid crystal light valve with Hybrid Field Effect Mode," Boswell et al. U.S. Pat. No. 4,019,807. A light-blocking layer 24 separates the liquid crystal portion 20 from the photoconductive portion 26, preventing the remote reference wavefront beam 10 from directly stimulating the photoconducting substrate 26. If light from the interference pattern 17 strikes the photoconductive substrate 26, the intensity pattern liberates photoelectrons, causing a small current to flow and hence the voltage to change across the liquid crystal 20 itself. This voltage change, proportional to the brightness of the interference pattern 17, generates a commensurate index change in the liquid crystal 20.

Summarizing the process, any wavefront error in the remote reference beam 10, by interfering with the perfect plane wave of the local reference 16, produces an interference pattern 17 upon the photoconductor 26. The intensity variations of the interference pattern 17 represent an exact map of the wavefront errors for the remote reference wave 10 entering the front side of the liquid crystal light valve 12. The current created by these intensity variations of the interference pattern 17 changes the voltage across the liquid crystal 20 directly behind the location of said variations. The electrically-engendered rotation of the liquid crystals alters their index of refraction proportionately until the phase of those points on the wavefront are brought back to their proper values. By using such negative feedback, the liquid crystal light valve 12 drives any wavefront error in the reflected remote reference wavefront to zero.

The resulting output wavefront 18 emerges through beamsplitter 15a corrected for wavefront phase errors. In some applications, the production of this corrected wavefront 18 is the sole desired result.

In other applications, a second conjugate wavefront must be generated using a higher-power beam which propagates over the same atmospheric path as the remote reference 10. Once the liquid crystal light valve device 12 has responded to the received remote reference wavefront 10 and has altered the orientation of the liquid crystal molecules to compensate for any wavefront phase errors, the liquid crystal layer 20 can function just as a deformable mirror in an adaptive optics system. A second light wavefront, often a higher-energy laser beam, can be directed through the aperture-sharing component 14 and launched off the liquid crystal device 20 in a reverse direction to the incoming remote reference wavefront 10. This higher energy laser beam will acquire all the phase information patterned within the liquid crystal layer, and will be predistorted in a time-reversed phase-conjugate sense. Time-reversed phase-conjugate signifies that the wave exactly resembles the incoming wavefront, except that it travels backwards in space, as if a motion picture of the wavefront reversed itself in time. The predistorted beam traverses all the atmospheric and other system aberrations to arrive at a target as a perfect wavefront. The liquid crystal light valve is a simple, compact solid-state device that combines the multiple wavelength utility of reflective deformable mirrors with the extraordinarily high resolution of phase-conjugation cells while avoiding many of their disadvantages.

Efficient operation of the above liquid crystal light valve adaptive optics system requires certain further refinements. The phase as well as the frequency of the local reference wavefront source 16 must be maintained relative to the remote reference wavefront 10. Additionally, the optical transfer system made up of those components which guide the remote reference wavefront 16 around the liquid crystal light valve device 12 to be combined with the local reference wavefront 16, must fulfill certain critical requirements for the device to function.

Figure 6:
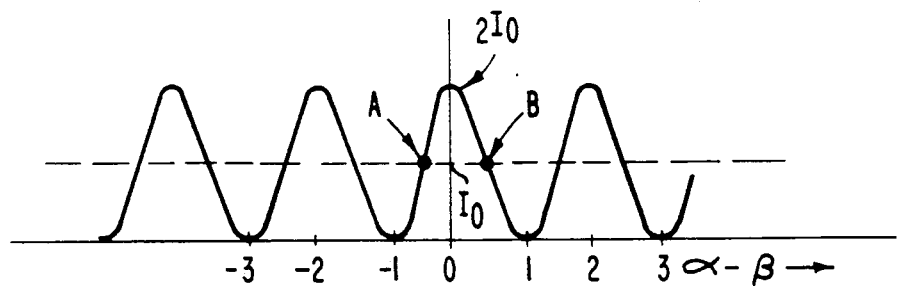
FIG. 6 is a plot of the amplitude of the interference pattern between a remote reference wavefront and the local reference. The mean intensity is plotted as a function of the phase difference between the two wavefronts.

In order to maximize the sensitivity of the present invention to small phase errors in the remote reference wavefront 10, the phase of the local reference plane wave 16 should be offset by $\pi/2$ radians from the mean phase of the remote reference wavefront 10 reflected from the front of the liquid crystal 20. FIG. 6 illustrates this requirement. If at any point x the remote reference wavefront 10 is described by $$U_{rr} = U_o \exp[i\alpha(x)]$$

while the local plane wave reference field 16 is given by $$Ul_r = U_o \exp[i\beta]$$

then the composite intensity of the interference pattern 17 varies according to $$I = I_o[1 - \cos(\alpha - \beta)]$$

as illustrated in FIG. 6. If there is no reference offset, the system will function around $\alpha - \beta = 0$ with no sensitivity to small wavefront errors $\alpha$. However, a reference offset of $\pm \pi/2$ shifts the operation of the system to either point A or point B, depending upon whether the loop gain for the phase-shifting system is negative or positive. In the preferred embodiment the overall system feedback is negative. At these operating regions, the system has maximum sensitivity to small relative phase shifts between the remote reference 10 and local reference 16 wavefronts, and hence optimum signal-to-noise performance.

Figure 7:
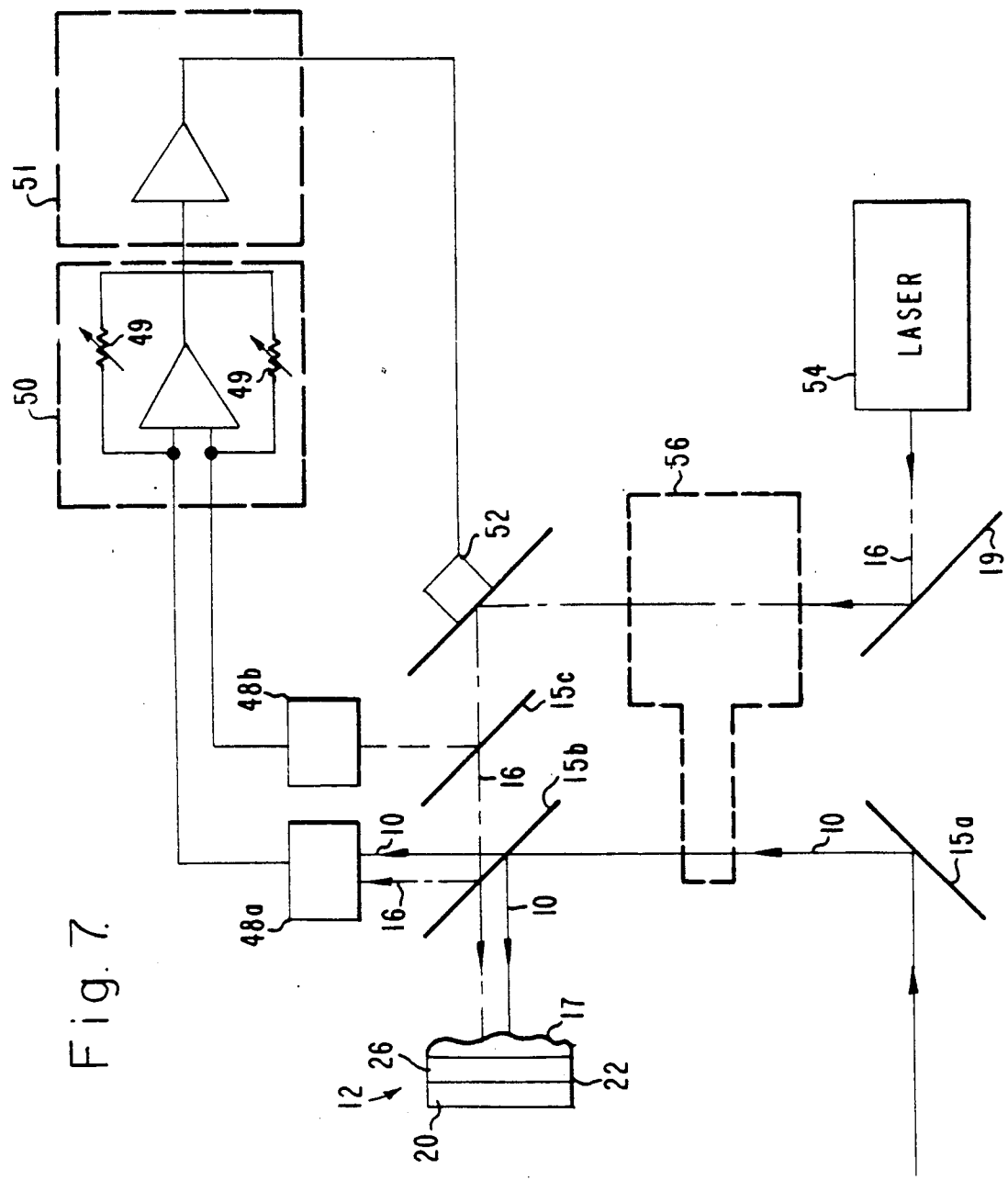
FIG. 7 is a schematic diagram of auxiliary apparatus to FIG. 1 for maintaining the relative phase between the local reference wavefront and the incoming remote reference wavefront.
Figure 8:
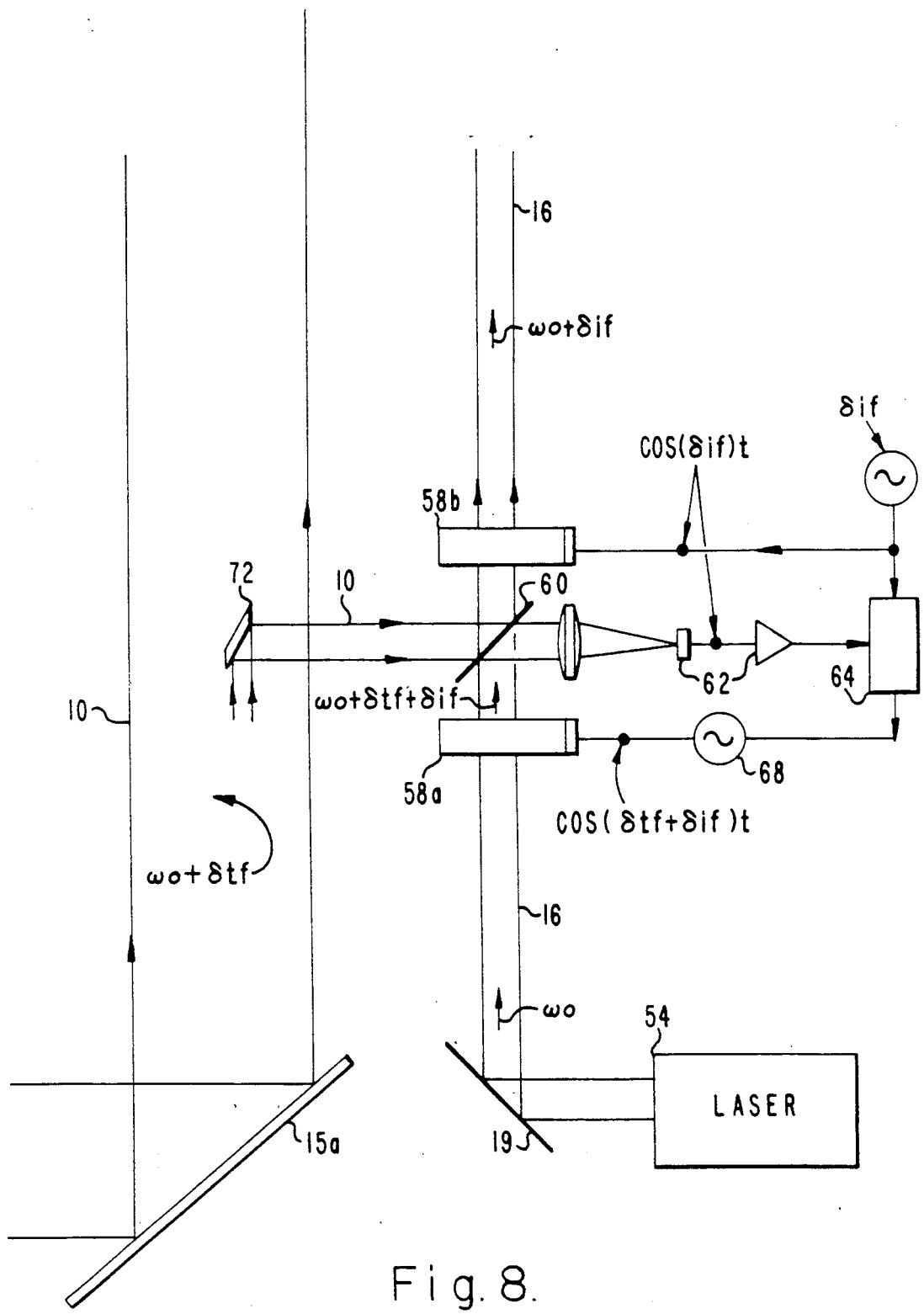
FIG. 8 schematically depicts apparatus to be added to the correction approach described in FIG. 1 and FIG. 7 such that a part of the incident remote reference is sampled and compared with the frequency of the local reference in a optical phase-locked loop, allowing the local reference laser to track frequency drifts in an incoming remote reference beam.

FIG. 7 shows an approach for maintaining such a local reference phase shift. Two detectors 48a,b are employed. For visible wavelengths, these detectors can be standard p-i-n Detectors, comprising a pin-hole aperture and photoelectric element. The voltage of such a detector is proportional to the light intensity passing through the pin-hole. Alternately, the detector may be a silicon avalanch photo-diode. One detector 48a measures the characteristic interference between the remote reference 10 and the local reference 16 wavefronts as was shown in FIG. 6. The second detector 48b measures just the strength of the local reference wave 16 alone. The differential operational amplifier (Op-Amp) 50 used conventionally with adjustable resistors 49, provides a difference signal from these two detectors which, amplified by a PZT amplifier 51, such as a Burleigh Model PA-70 drives a piezoelectric mirror 52. Since the difference signal exhibits a null precisely at the desired operating points ($\pi/2$ radians offset) shown in FIG. 6, the local piezoelectric servo 52 will drive the system to a lock point at either point A or B in FIG. 6, depending upon the sign of the feedback gain. At that point, the local reference plane wave 16 will be exactly $\pi/2$ radians out of phase with the mean phase of the remote reference wavefront 10. Since the relative phase between local and remote references has been set by the feedback apparatus, described above, the frequency differences between the two lightwaves must be minimized. One set of apparatus which can accomplish such frequency tracking, alluded to in block 56 in FIG. 7, is elaborated in FIG. 8.

Again, a local laser oscillator source 54 provides the reference plane wave. The local reference 16 reflects off reflector 19 and enters a Bragg cell 58a. Bragg Cells, available commercially, use some electro-optic substance, often tellurium dioxide. An applied voltage frequency induces acoustic waves within the cell which, by modulating the index of refraction, can cause frequency shifts in light waves passing through the substrate. In this embodiment, the cell shifts the local laser oscillator frequency to track the remote reference wavefront sample 10 picked off by the small mirror 72. The remote reference frequency will have frequency drift and Doppler shifts. By combining the picked-off sample of the remote reference wavefront beam 10 and the frequency shifted local reference 16a using beamsplitter 60, a heterodyne detector 62 can determine the frequency difference $\delta_{lf}$ between the two. A heterodyne detector is simply another p-i-n or silicon avalanch photo-diode as before, but in this application the amplitude of its output will be modulated by the frequency beating from the combined local 16 and remote 10 references. The signal from the heterodyne detector, combined, using a conventional lock-in amplifier 64, with a local oscillator source 66 tuned to an intermediate frequency described below, provides an output voltage which drives the voltage-controlled oscillator 68. This oscillator uses the Bragg cell 58a to shift the frequency $\omega_o$ of the local laser 54 by this frequency difference $\delta_{lf}$. The negative feedback of the loop maintains the local laser frequency at that of the remote reference.

For better frequency tracking and to avoid 1/f noise in the post-detector electronics, however, the phase-locked loop tracks at an intermediate constant frequency offset provided by oscillator 66. Added to the signal from the heterodyne detector 62, it shifts the local laser frequency $\omega_o$ by the intermediate frequency $\delta_{if}$. The second Bragg cell shifts the local reference frequency in the opposite direction by removing the intermediate frequency offset $\delta_{if}$, but not the tracking frequency offset $\delta_{tf}$. Thus, the local laser reference leaves the phase-locked loop at a frequency equal to $\omega_o + \delta_{tf}$ and tracks the remote reference 10 despite phase and frequency shifts which are not common to the two oscillators. Furthermore, because of the rapid frequency shifts available in Bragg cells, this phase-locked loop system 56 FIG. 8 can track very rapid changes in either laser oscillator frequency (local or remote).

In addition to satisfying these phase-relation and frequency matching requirements, the liquid crystal light valve adaptive optics system must also satisfy certain optical requirements in order to operate efficiently. First, as alluded to in FIG. 1, the remote reference beam 10 must impinge on the front side of the liquid crystal light valve 12 slightly off-axis both to permit efficient extraction of the remote reference wavefront 10 after it strikes the liquid crystal layer 20 and also to allow efficient injection of a second laser wavelength 11 in many dual-wavelength applications.

As a further requirement, the beam incident upon the backside photoconductive layer 26 of the liquid crystal light valve 12, i.e., the interference pattern 17 produced by wavefronts 10 and 16, must be in accurate registration with the wavefront 10 striking the front side. More precisely, the charge pattern and the electric field applied to the liquid crystal layer must be in exact spatial registration with the front-side, remote reference phase pattern 10 which produced them. Thus the back-side beam comprising the interfering remote 10 and local 16 reference wavefronts must make the same incidence angle to the photoconductor as the front-side beam 10, just as that illustrated in FIG. 1. Otherwise, projective misregistrations occur.

As a further requirement, the optical relay system which reflects the incident remote reference wavefront 10 from the front to the back of the liquid crystal light valve 12 must not invert the image in the plane of the relay system. In other words, an even number of reflective surfaces is required. One possible embodiment of such a system of reflective elements was shown in FIG. 1, where another mirror 19 was inserted in the optical path between beamsplitters 14 and 15a. This figure also included the above requirement that the angles of incidence for both the front 10 and the backside 10 plus 16 wavefronts be equal.

Yet another requirement, shared in common by all adaptive optics systems, is that the relay fidelity be commensurate with the basic spatial compensation capability of the system, usually described in conventional discrete channel adaptive optics systems as the number of correction elements. For the liquid crystal light valve adaptive optics system this number can be quite high, well over one million elements. Such a large number of channels challenges the resolution and fidelity capabilities of a given system. In most applications the full (million element) potential of the system is not required and in many other applications the strength of the remote reference wavefront 10 is not adequate to sustain reasonable signal-to-noise ratios in the face of a minimal per element photon count associated with this large number of elements.

Diffractive spreading within such a high spatial-resolution phase modulation system presents a serious problem. The pixel size of the liquid crystal light valve is estimated to be approximately 33 microns. This determines the smallest resolvable bit of spatial phase information the system can sense and correct. If this upper limit in resolution is to be exploited, the diffraction within the system must be limited. The diffractive spreading of light emerging from an aperture is given by $$k = L\lambda/d$$

where k is the spatial deviation of light ray emerging from a point source, L is the length travelled by the light (in this case, L is the distance of the optical relay system from the front surface 20 to the rear surface 26 of the liquid crystal light valve 12), $\lambda$ is the wavelength of light, and d is the diameter of the aperture. This diameter would be 33 microns for the subject invention. Since the diffractive deviation varies as the inverse of the diameter, the problem of diffractive spreading for a very high-resolution system as in the present invention is many times greater than for a current discrete channel deformable mirror.

Figure 9:
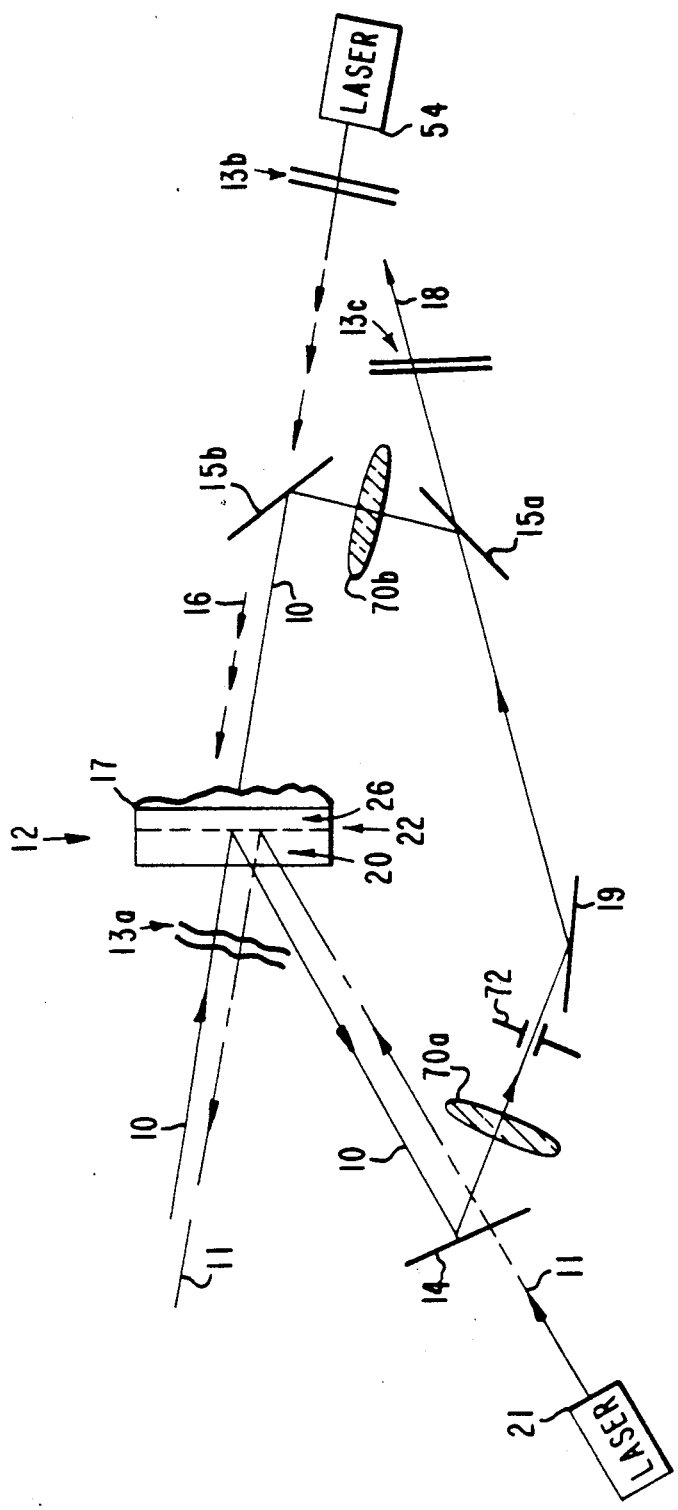
FIG. 9 shows a one-to-one imaging system added to the correction apparatus detailed in FIG. 1, such that the resolving power of the adaptive optics system is increased and diffractive spreading from front-to-back is minimized.
Figure 10:
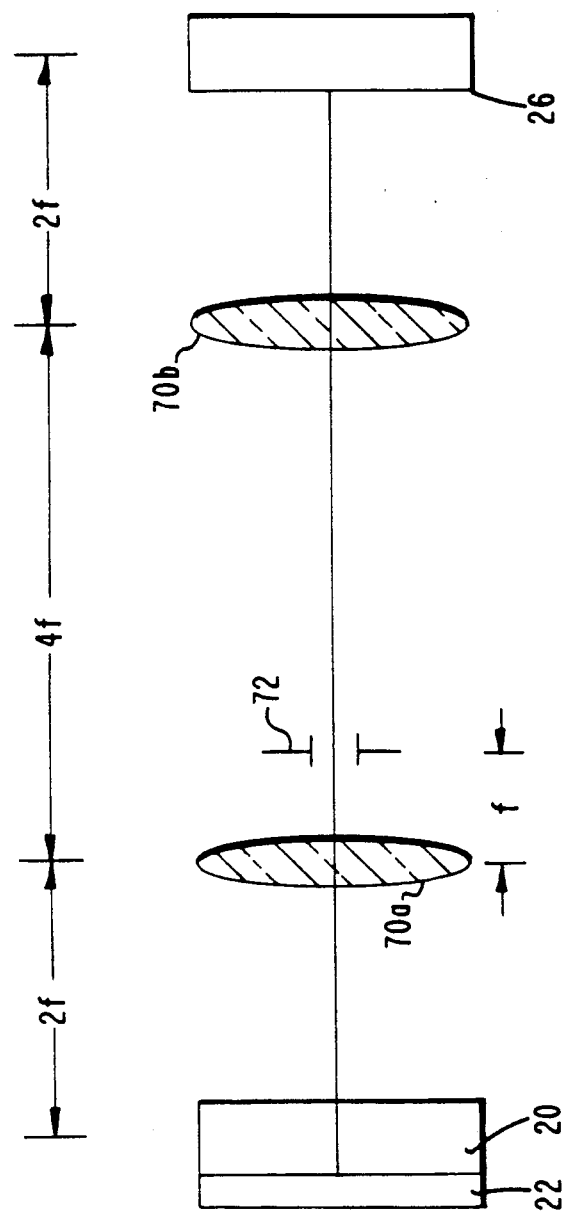
FIG. 10 is a schematic diagram of the one-to-one imaging system shown in FIG. 9.

One method for correcting the diffractive spreading in such an adaptive optics system is shown in FIG. 9. The optical train, composed of an even number of reflective surfaces (mirrors, beamsplitters, or shared-aperture components), has two identical lenses inserted at specific locations within the optical path. The schematic of such a layout without the reflective elements (since these may be placed at various possible locations) is shown in FIG. 10. The lenses both have focal lengths f. The first lens 70a is located a distance 2f from the front reflective surface 20 of the liquid crystal light valve 12. The remote reference 10, after reflecting off the liquid crystal 20, passes through lens 70a and then through a "mild" spatial filter 72, at a distance f from lens 70a.

The mild spatial filter 72 acts as an aperture stop and might be an adjustable iris. It controls the bandwidth of spatial frequencies the system will handle, since at the focal plane of lens 70a, the light's higher spatial frequency information is displaced from the central optical axis. If this higher spatial frequency information is blocked by the aperture stop (mild spatial filter) then the spatial frequency requirements for the system are lessened.

A second lens 70b with a focal length f is placed a distance 3f from the spatial filter 72, i.e., a distance 6f from the front reflective surface 20 of the liquid crystal light valve 12. The remaining distance between the second lens 70b and the rear photoconductive surface 26 of the liquid crystal light valve 12 is 2f. These distance ensure that the image of the remote reference wavefront 10 after reflecting off the front surface liquid crystal 20 will be imaged exactly one-for-one onto the back surface photoconductor 26. The even number of reflective elements ensures that the image is noninverted.

This imaging system shown in FIGS. 9 and 10 corrects for any diffractive spreading in the optical transfer means of the liquid crystal light valve adaptive optics system and reliably images each pixel of spatial wavefront information from the front reflective liquid crystal surface 20 to the back surface photoconductive layer 26. The adjustable mild spatial filter 72 provides further system flexibility for adjusting the actual spatial frequency bandwidth the apparatus will resolve.

Although the present invention has been described in detail with reference to a particular preferred embodiment, persons possessing ordinary skill in the art to which this invention pertains will appreciate that various modifications may be made without departing from the spirit and scope of the invention.

What is claimed is:

1. An adaptive optics apparatus comprising:
   photoconductive feedback spatial phase modulation means having a photosensitive first part, a reflective second part, and a third part including a medium having an index of refraction that changes in response to an applied voltage;
   means for providing a local reference wavefront;
   optical combination means for combining a portion of said local reference wavefront with a second portion of a remote reference wavefront which has interacted with said spatial phase modulation means so that said wavefronts interfere and impinge on said photosensitive first part of said photoconductive feedback spatial phase modulation means at substantially the same angle of incidence as said remote reference wavefront strikes said third part of said photoconductive feedback spatial phase modulation means, and so that said remote reference wavefront is in registration with and is opposite said reflected portion of said remote reference wavefront;
   means for maintaining a constant relative phase between said local reference wavefront and said remote reference wavefront, connected to said means for providing said local reference wavefront; and
   a plurality of optical relay means for relaying said remote reference wavefront to said optical combination means.

2. Apparatus as claimed in claim 1 in which said plurality of optical relay means further comprises:
   reflective relay means; and
   optical aperture-sharing means for transmitting a readout wavefront and allowing said readout wavefront to be reflected from said second reflective part of said photoconductive feedback spatial phase modulation means, and for simultaneously reflecting a portion of said remote reference wavefront and allowing it to be relayed by said reflective relay means to said optical combination means.

3. Apparatus as claimed in claim 2 in which said reflective relay means further comprises a plurality of reflective elements, said plurality being an even number so that said remote reference wavefront is in registration with and is opposite said second portion of said remote reference wavefront.

4. An adaptive optics apparatus comprising:
   photoconductive feedback spatial phase modulation means having a photosensitive first part, a reflective second part, and a third part composed of a medium having an index of refraction that changes in response to an applied voltage;
   folding means for folding a second optical path traversed by a second portion of a remote reference wavefront reflected from said reflective second part of said photoconductive feedback spatial phase modulation means after having passed through said third part of said photoconductive feedback spatial phase modulation means, a first portion of said remote reference wavefront having been incident at an off-axis angle on said photoconductive feedback spatial phase modulation means;
   first optical dividing means for dividing said second portion of said remote reference wavefront into a third portion propagating along a third optical path, and a fourth portion propagating along a fourth optical path;
   reflective means disposed along said third optical path for relaying said second portion of said remote reference wavefront to said first optical dividing means;
   means for generating a local reference wavefront;
   second optical dividing means for causing a first portion of said local reference wavefront to travel along a fifth optical path and impinge on said photosensitive first part of said photoconductive feedback spatial phase modulation means,
   and causing a fifth portion of said remote reference wavefront to travel along said fifth optical path and also impinge on said photosensitive first part of said photoconductive feedback spatial phase modulation means,
   in a direction which is substantially collinear with the direction of incidence of said first portion of said remote reference wavefront on said reflective second part of said photoconductive feedback spatial phase modulation means, so that optical interference between said first portion of said local reference wavefront and said fifth portion of said remote reference wavefront occurs; and
   means for maintaining a constant frequency difference and a constant relative phase between said local reference wavefront and said remote reference wavefront, connected to said means for generating said local reference wavefront and partly disposed along said third optical path to sample said third portion of said remote reference wavefront.

5. Apparatus as claimed in claim 4 in which said folding means is a shared-aperture reflective element.

6. Apparatus as claimed in claim 4 in which said first and second optical dividing means are multilayer dielectric beamsplitters.

7. Apparatus as claimed in claim 1 which additionally comprises:
   means for noninverted 1:1 imaging of said remote reference wavefront onto said photosensitive first part of said photoconductive feedback spatial phase modulation means;
   means for spatial filtering of said remote reference wavefront; and
   means for maintaining a constant relative phase between said local reference wavefront and said remote reference wavefront, connected to said means for generating said local reference wavefront.

8. Apparatus as claimed in claim 7 in which said means for noninverted 1:1 imaging is purely refractive.

9. Apparatus as claimed in claim 7 in which said means for noninverted 1:1 imaging is purely reflective.

10. Apparatus as claimed in claim 7 in which said means for noninverted 1:1 imaging is catadioptric.

11. Apparatus as claimed in claim 7 in which said means for noninverted 1:1 imaging further comprises:
    first means for light focussing having focal length f, placed at a distance 2f from said reflective second part of said photoconductive feedback spatial phase modulation means; and second means for light focussing having focal length f, placed at a distance 6f from said reflective second part of said photoconductive feedback spatial phase modulation means;

and said means for spatial filtering is placed at a distance f from said first focussing means.

12. Apparatus as claimed in claim 7 which additionally comprises:

means for maintaining a constant frequency difference and a constant relative phase between said local reference wavefront and said remote reference wavefront, connected to said means for generating said local reference wavefront and partly disposed along said third optical path to sample said third portion of said remote reference wavefront.

13. Apparatus as claimed in claim 11 in which said first and second focussing means are anastigmatic compound lenses.

14. Apparatus as claimed in claim 11 in which said means for spatial filtering is an iris aperture stop.

* * * * *